United States Patent [19]

Chen

[11] Patent Number: 5,411,468
[45] Date of Patent: May 2, 1995

[54] MASSAGING PILLOW DEVICE USED IN A CAR

[76] Inventor: K. C. Chen, No. 22, Lane 10, Sec. 4, Cheng Te Road, Taipei, Taiwan, Prov. of China

[21] Appl. No.: 52,155

[22] Filed: Apr. 23, 1993

[51] Int. Cl.⁶ ............................................. A61H 1/00
[52] U.S. Cl. .................................. 601/57; 601/56; 601/49; 297/391; 297/217.3
[58] Field of Search ............... 297/391, 217; 601/46, 601/47, 49, 56–58

[56] References Cited

U.S. PATENT DOCUMENTS

| | | | |
|---|---|---|---|
| 2,527,656 | 10/1950 | Reinsdorf | 297/217 |
| 2,629,023 | 2/1953 | LaFitte | 297/391 |
| 2,719,577 | 10/1955 | Eyman | 297/391 |
| 3,854,474 | 12/1974 | Carruth | 601/57 X |
| 4,310,307 | 1/1982 | Bellisario | 297/217 X |
| 4,797,934 | 1/1989 | Hufnagel | 297/391 X |
| 5,238,295 | 8/1993 | Harrell | 297/391 X |
| 5,275,462 | 1/1994 | Pond et al. | 297/391 X |

FOREIGN PATENT DOCUMENTS

| | | | |
|---|---|---|---|
| 1959356 | 11/1969 | Germany | 297/391 |
| 2406561 | 8/1975 | Germany | 297/391 |
| 3235373 | 3/1984 | Germany | 297/391 |
| 3318866 | 11/1984 | Germany | 297/391 |

*Primary Examiner*—Robert A. Hafer
*Assistant Examiner*—Brian E. Hanlon
*Attorney, Agent, or Firm*—Pro-Techtor International

[57] ABSTRACT

A massaging cushion device used in a car, which included a hollowed frame of suitable size. The frame is connected onto a seat in a car. On both lateral sides of the frame there are two massaging devices movably connected therewith. The ends of the massaging devices extend into the lateral sides respectively for pivotal connecting therewith. A plurality of driving structures are provided on one side of each of the massaging devices. The massaging devices are capable of being spread out about the pivot, and are capable of folding for storage in the hollowed interior of the frame.

2 Claims, 9 Drawing Sheets

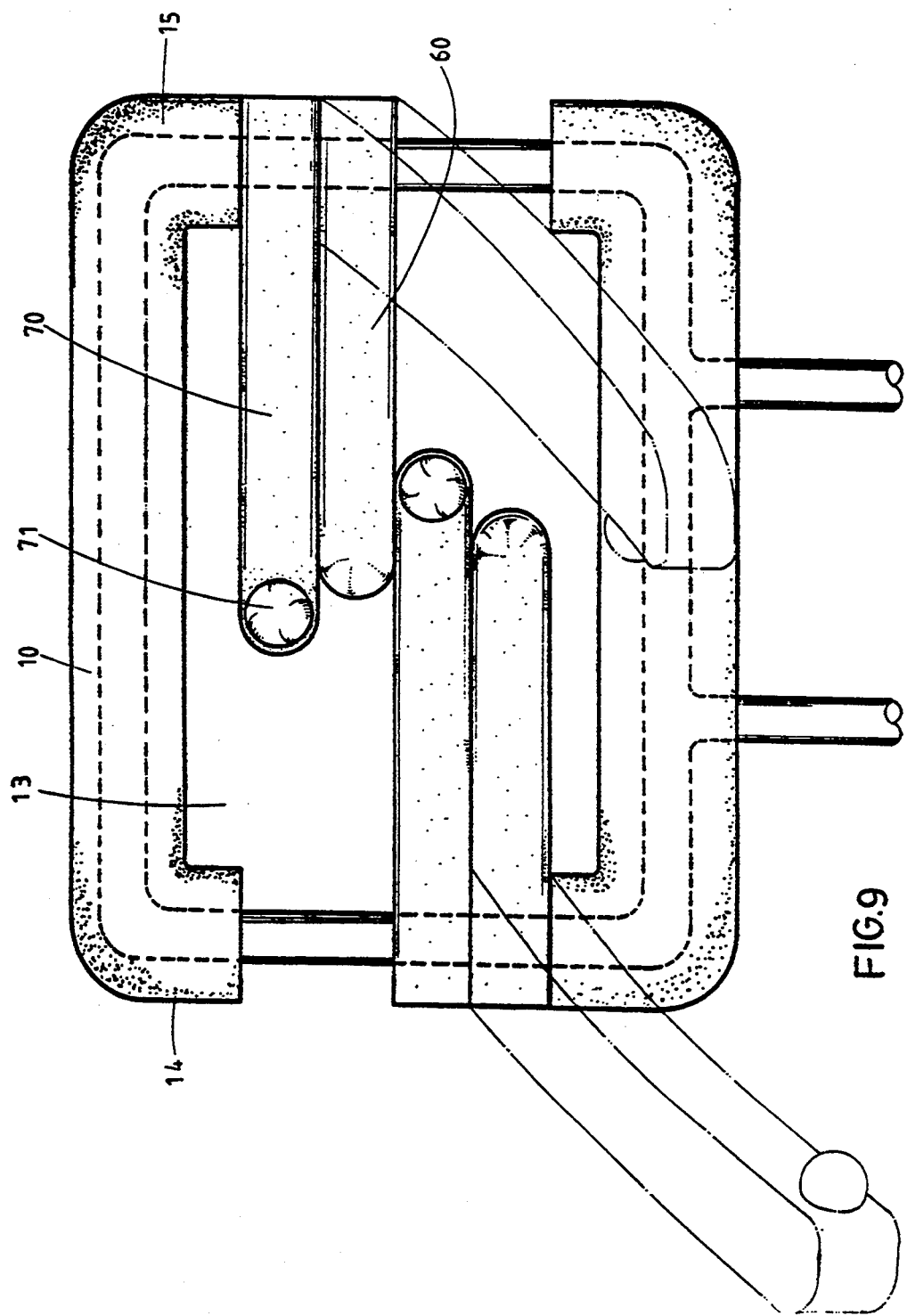

MASSAGING PILLOW DEVICE USED IN A CAR

BACKGROUND OF THE INVENTION

In our modern life, an automobile is quite necessary for people instead of walking on foot. And generally there are cushions on the top portions of the seats in a car for a driver to lean his/her head on a cushion during driving, thus, alleviating the pain in the neck created after a lengthy drive.

The existing cushions on the seats in a car are mostly cushions simply to support the head and neck of a driver, whether they are constructed with a hollowed frame or a solid cushion.

A long drive can be uncomfortable for a driver, especially when cars are crowded and jammed on a highway. The driver is subjected to fatigue and is therefore tired. Some portions of his/her head and neck can become stiff and feel achy. A normal cushion can not effectively alleviate the ache or pain the neck in these cases.

The present invention relates to a modification of the cushion used in a car, and especially relates to a cushion which has a plurality of massaging pads capable of moving out of the frame of the cushion to massage some portions of one's head and/or neck. The pads are capable of moving back into the frame for storage.

SUMMARY OF THE INVENTION

The present invention is mainly for providing a device of cushion used in a car, wherein the cushion is made having a hollowed frame. Two massaging devices are pivotably connected, one on each side of the frame. These massaging devices can spread out forwardly in differing angles about their pivot axles. The head/neck of the driver can thereby lean on them and press them to activate the circuits therein, and cause the massaging devices to vibrate. After use, the massaging devices can be folded for storage in the frame.

The novelty as well as other features of the invention are now described in referring to the accompanying drawings.

BRIEF DESCRIPTION OF THE DRAWINGS

FIG. 9 is a schematic view of the embodiment of FIG. 6 when installed in a hollowed frame.

DETAILED DESCRIPTION OF THE PREFERRED EMBODIMENTS

Figure 1:
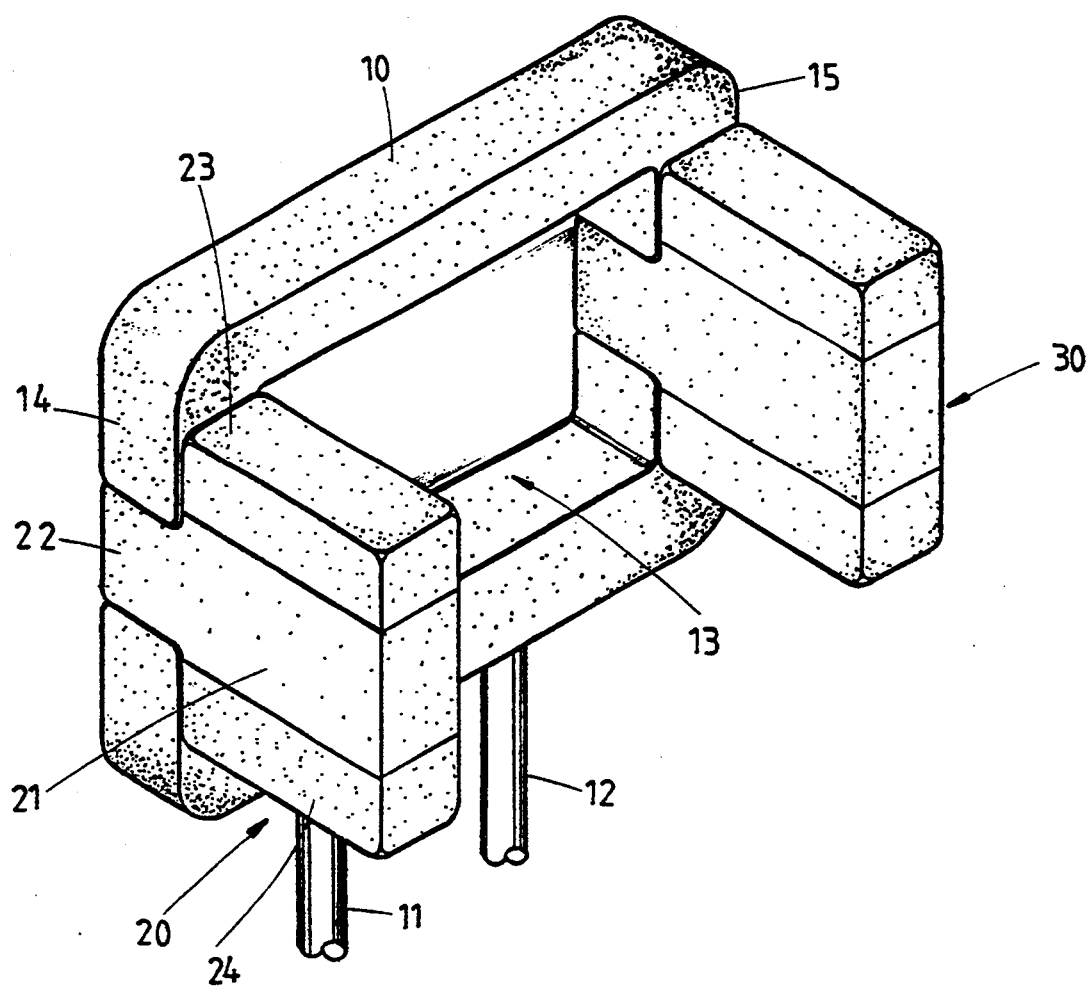
FIG. 1 is a perspective view of the preferred embodiment of the massaging device of the present invention when in a spread position.
Figure 2:
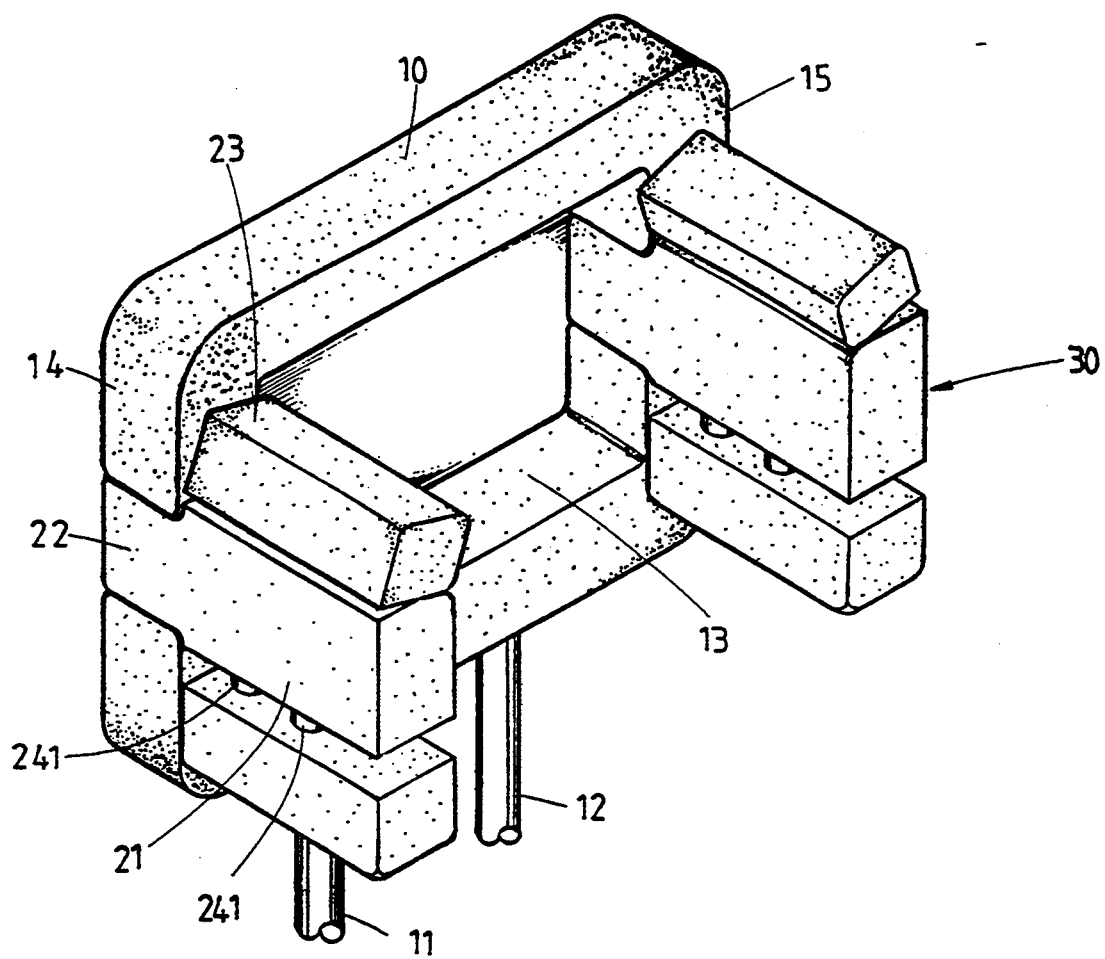
FIG. 2 is a perspective view showing another position of adjustment of the device in FIG. 1.

Referring to FIG. 1, the present invention has generally a hollowed frame 10 of suitable size for a human head. The frame 10 can be connected onto a seat in a car by a plurality of bottom supports 11, 12 and is formed to have a hollowed interior 13.

The lateral sides 14, 15 of the hollowed frame 10 are equipped with massaging devices 20, 30 which are connected pivotably to the sides 14, 15. The structure of one of the devices 20, 30 is now described by way of example.

Figure 4:
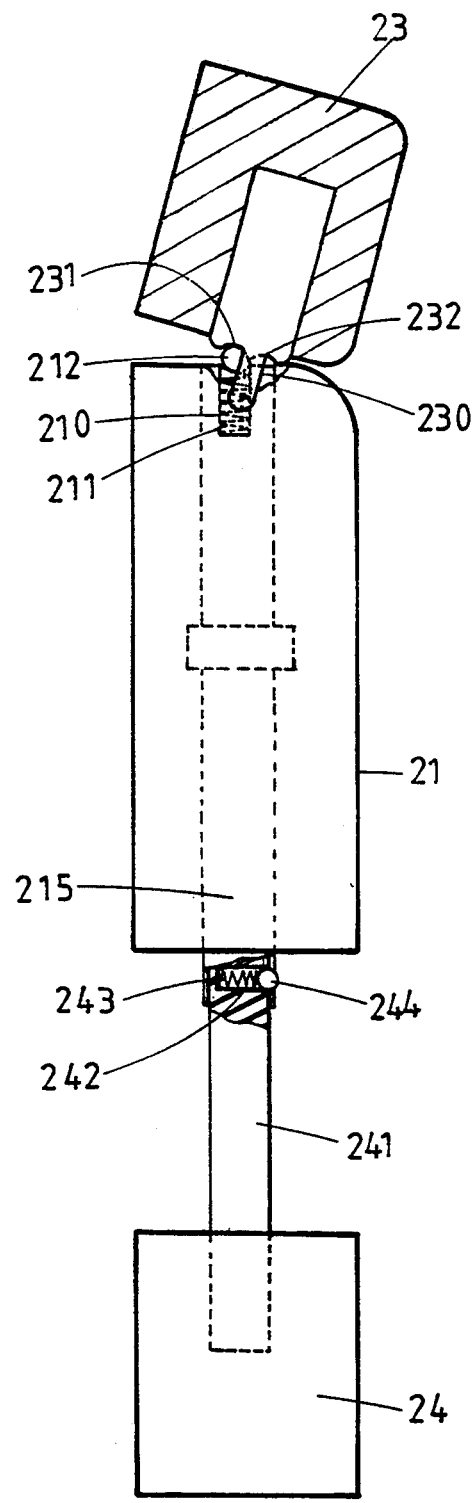
FIG. 4 is a side view of the device of FIG. 2 in the adjusted position.

Referring together to FIGS. 1 and 4, the massaging device 20 has generally a middle section 21. The end 22 of the middle section 21 extends into the lateral side 14 for pivotal connection therewith. There are upper and lower massaging pads 23, 24 above and beneath the middle section 21 respectively. As shown in FIG. 4, the upper massaging pad 23 is connected onto the top end of the middle section 21. In this practical embodiment, the top surface of the middle section 21 is provided with a hole 210 to allow the loading in sequence of a spring 211 and a steel ball 212. The upper massaging pad 23 has an axle 230 extending into the hole 210, and has two arched notches 231, 232 that allow the upper massaging pad to move back and forth to adjust the angular position thereof.

The lower massaging pad 24 has a post 241 extending into an inner pipe 215 in the middle section 21. A hole 242 near the top end of the post 241 has a spring 243 and a steel ball 244 therein. The pipe 215 has a plurality of punched holes which receive said steel ball to achieve the height adjustment of said frame 10.

Figure 3:
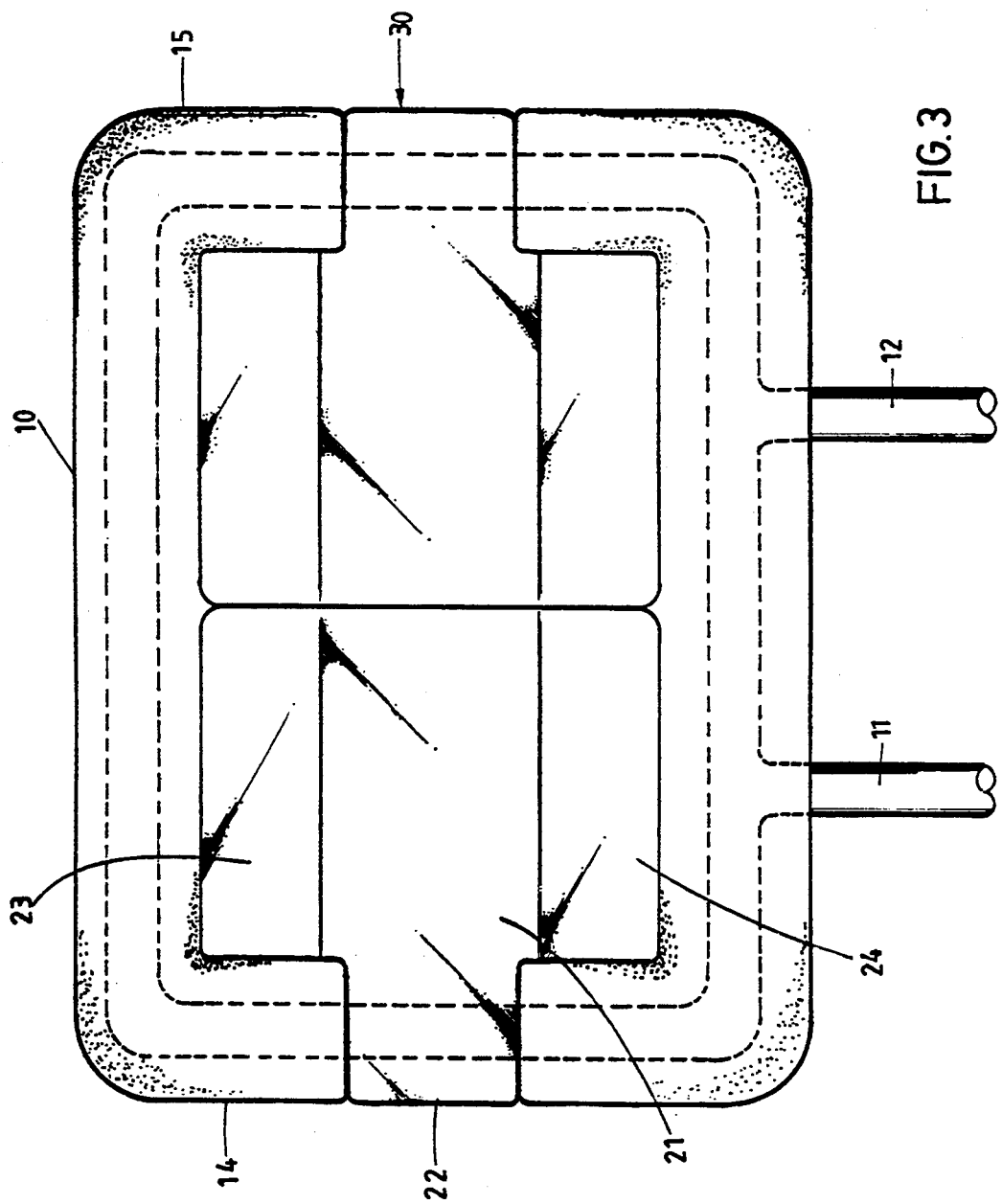
FIG. 3 is a front view of the device of FIG. 1 when folded.

As shown in FIG. 3, the massaging devices 20, 30 can be folded into the hollow interior 13 of the frame 10. The massaging devices also can be spread out about the pivot axes as shown in FIG. 1.

Figure 5:
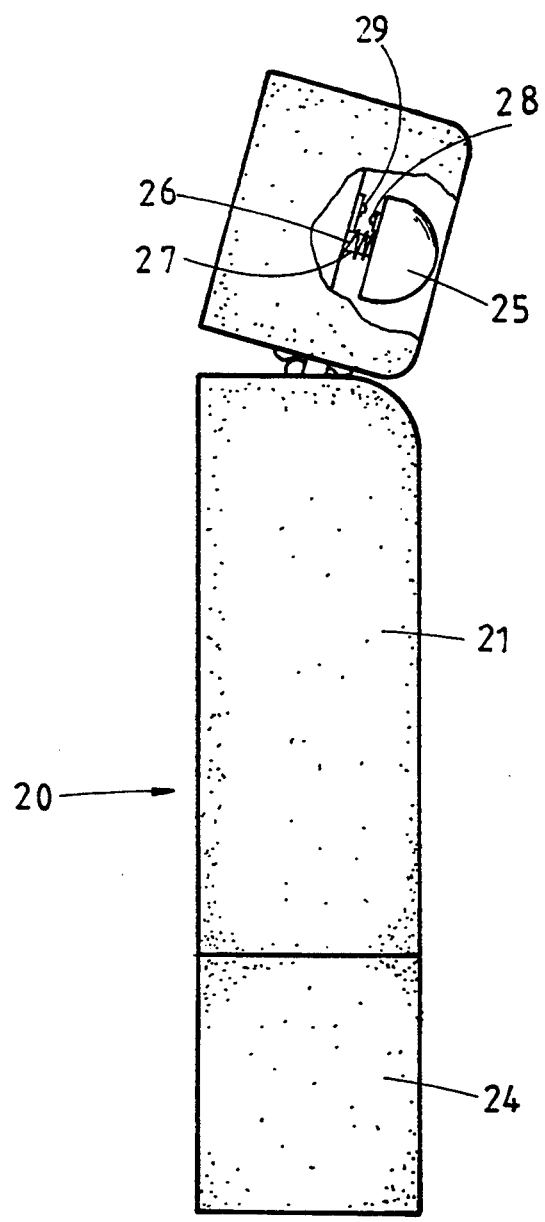
FIG. 5 is a partial cutaway view of the device of FIG. 1 showing the interior driving structure of a massaging device.
Figure 6:
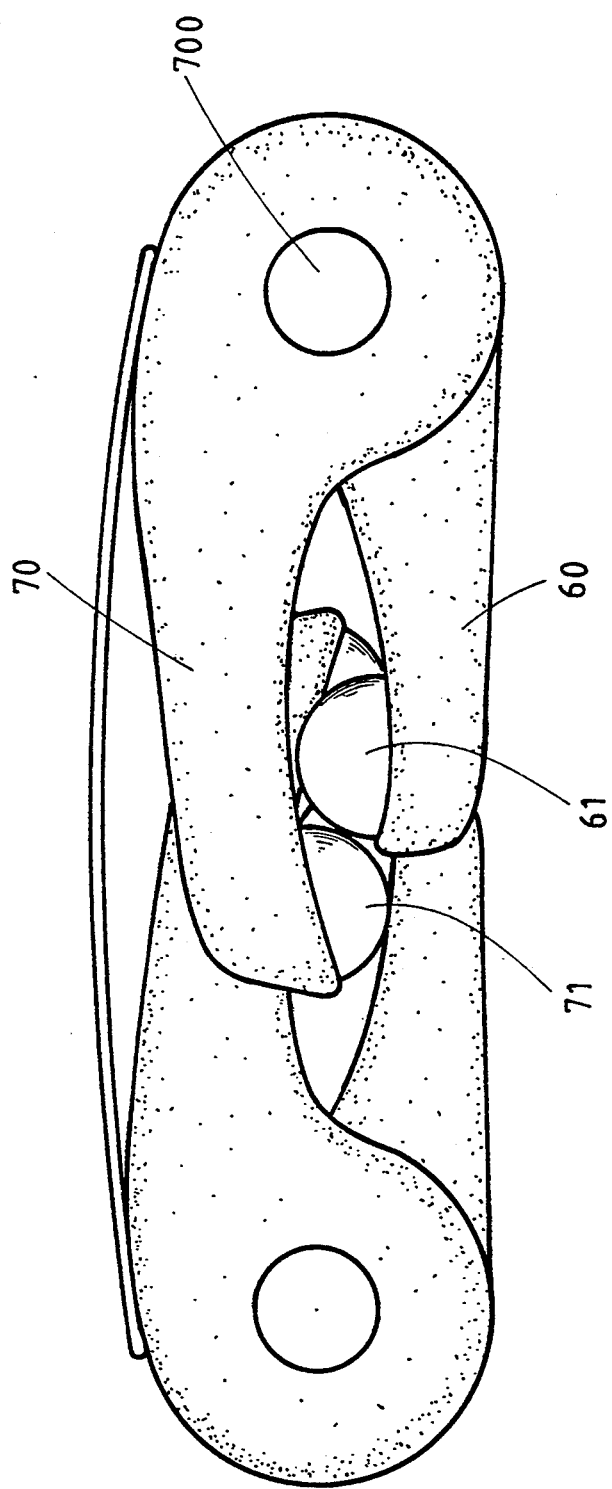
FIG. 6 is a top view of another embodiment of the present invention.
Figure 7:
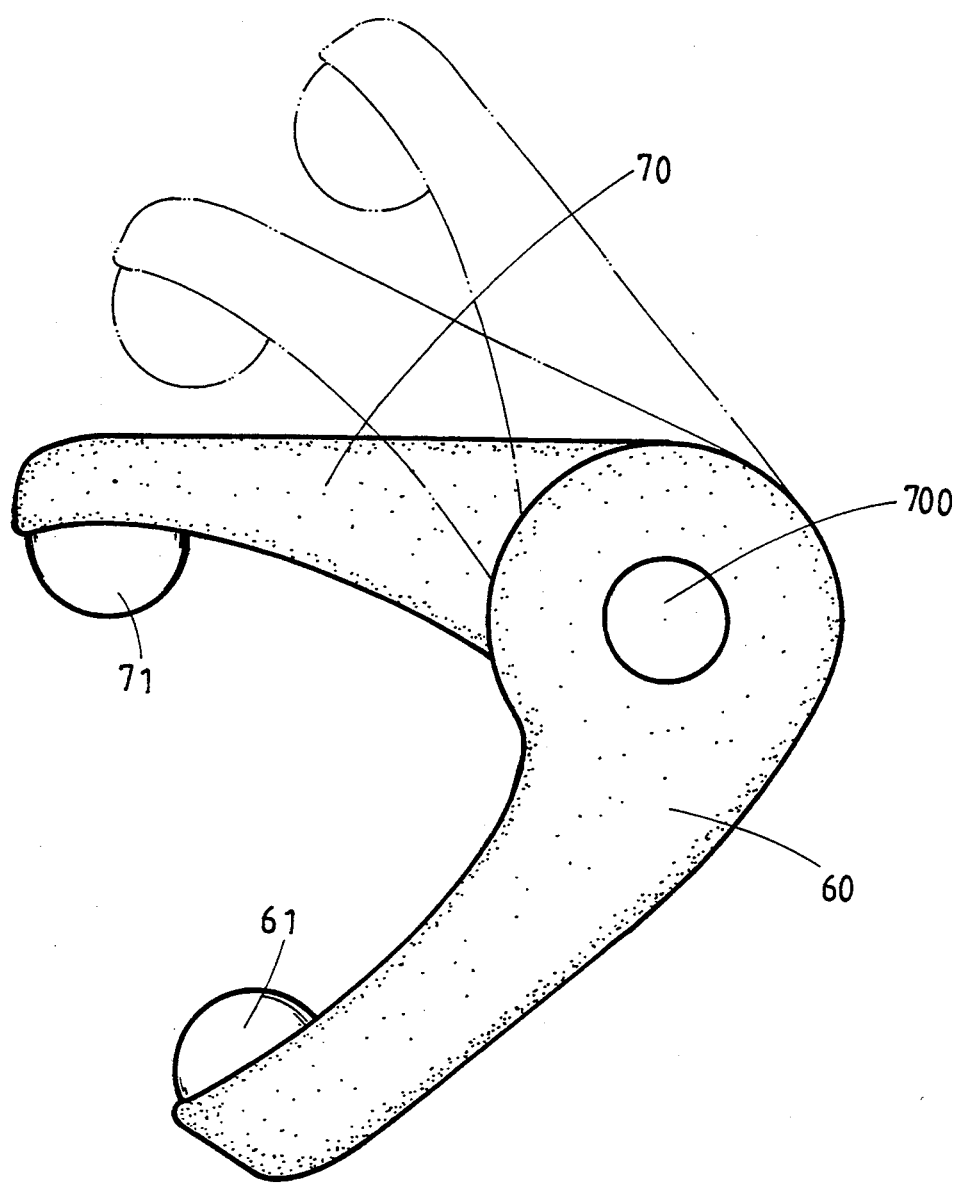
FIG. 7 is a view of the device of FIG. 6 showing the moving action of a massaging device.

Referring now to FIG. 5, the upper and lower massaging pads 23, 24 each has a driving structure including an internal push button 25. The push button 25 has a contractible rod 27 enclosed by a spring 26. Two contact points 28, 29 are provided behind the push button 25. When the push button 25 is pressed down, the contact points 28, 29 are connected to activate a circuit to generate a vibration. The circuit includes a standard vibration generating device, which is well known in the art.

FIGS. 6-9, illustrating another embodiment of the present invention, show a plurality of massaging devices 60, 70 are pivotably connected into the frame 10. In this embodiment, the massaging devices 60, 70 are all in the shape of bars pivotably connected to common axes. On a common end of the bars is a pivot 700 for pivotal connection of the bars to the lateral sides of the frame 10. On the free ends of the bars there are massaging balls 61, 71. In the embodiment shown in FIGS. 6-9, the balls 61, 71 are on inner sides of the bars, with the bar 70 being longer than the bar 60. The space occupied by these bars can be reduced when they are folded, and the bars can be stored conveniently in the interior 13 of the frame 10 (such as in FIG. 9).

Figure 8:
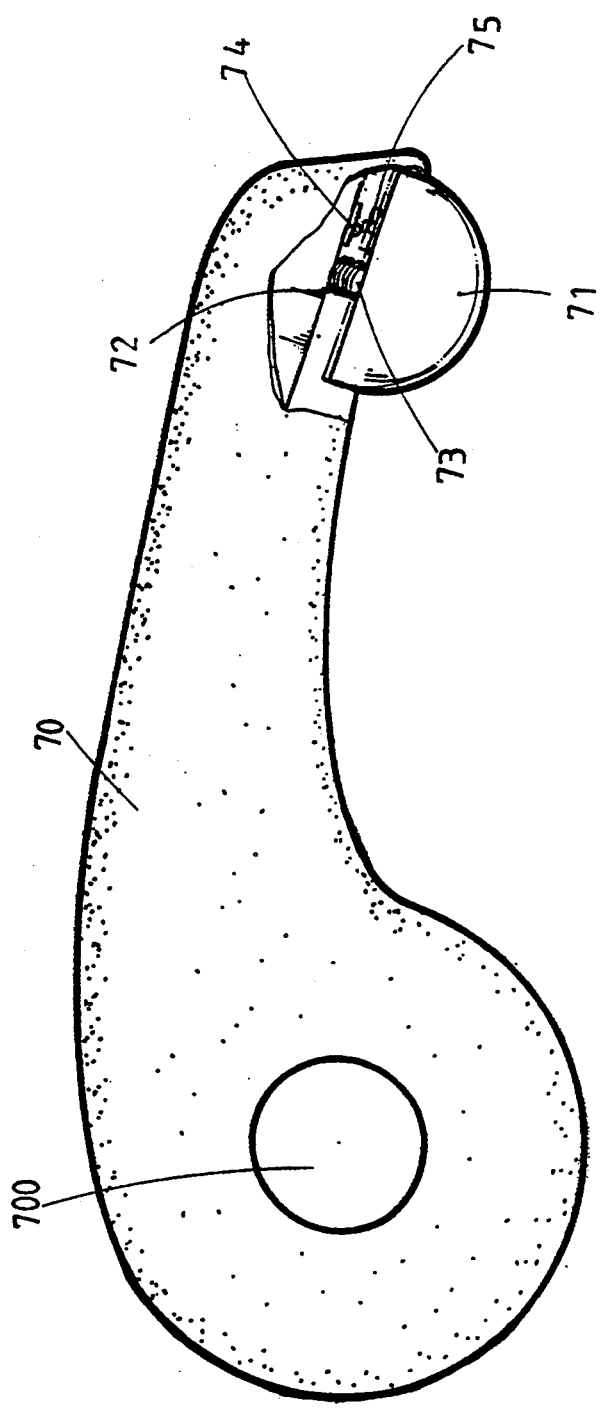
FIG. 8 is a partial cutaway view of the device of FIG. 6 showing the driving structure of a massaging device.

With reference to FIG. 8, the upper massaging ball 71 is also provided with a driving structure including a contractible rod 73 having a spring 72 thereon, and also with two contact points 74, 75. When the ball 71 is pressed, the points 74, 75 contact each other to activate a circuit to generate a vibration. The circuit includes a standard vibration generating device, which is well known in the art.

Referring now to the embodiment shown in FIGS. 1-5 as an example, when the invention is installed in a car, the massaging devices 20, 30 can be spread out about the pivot center, and a driver need only to lean the portions of his/her head which are in need of a massage on the upper and lower pads 23, 24 to activate the circuitry to generate a number of vibrations. Adjustments are feasible through the angle adjusting of the upper pad 23 and height adjusting of the lower pad 24, so that massage for different portions of a head is practicable. The massaging devices 20, 30 can be stored in the frame when not in use.

This structure is novel as compared to the normal cushions used on the seats in a car. Having thus stated the present invention in detail, it can be understood that the present invention can have other embodiments and varieties without departing from the spirit of the invention and the scope of the claims.

I claim:

1. A massaging cushion device used in a car comprising:
   a hollowed frame which connects to the top of a seat in the car;
   at least two massaging devices pivotably connected on the lateral sides of said frame, with the ends of each of said massaging devices extending into corresponding lateral sides respectively for pivotal connection;
   a plurality of driving structures being provided on said massaging devices, said driving structures including circuitry activated by pressure, said circuitry triggering a vibration when activated;
   said massaging devices being spread out about a pivot center for said pivotal connection when in use, and are folded into said hollowed frame when not in use;
   said massaging devices each include a middle section, and upper and lower massaging pads provided respectively above and below said middle section, and an end of said middle section being pivotably connected with said hollowed frame;
   said middle sections each include a hole on a top surface thereof for loading in sequence a spring and a steel ball;
   said upper massaging pads each having an axle extended into said hole, and having a plurality of arched notches on said upper massaging pad to receive said steel ball to adjust the angular position of said upper massaging pad.

2. A massaging cushion device used in a car comprising:
   hollowed frame which connects to the top of a seat in the car;
   at least two massaging devices pivotably connected on the lateral sides of said frame, with the ends of each of said massaging devices extending into corresponding lateral sides respectively for pivotal connection;
   a plurality of driving structures being provided on said massaging devices, said driving structures including circuitry activated by pressure, said circuitry triggering a vibration when activated;
   said massaging devices being spread out about a pivot center for said pivotal connection when in use, and are folded into said hollowed frame when not in use;
   said massaging devices each include a middle section, and upper and lower massaging pads provided respectively above and below said middle section, and an end of said middle section being pivotably connected with said hollowed frame;
   said lower massaging pad has a post extending upward to connect with an inner pipe provided in said middle section, a hole being provided on a top end of said post with a spring and a steel ball loaded in said hole, said inner pipe having a plurality of punched holes to receive said steel ball to achieve the height adjustment of said frame.

* * * * *